US005293833A

United States Patent [19]

West et al.

[11] Patent Number: 5,293,833

[45] Date of Patent: Mar. 15, 1994

[54] SPLASH CONTAINMENT TESTING DEVICE FOR EMEGENCY EYE WASH UNITS

[75] Inventors: Rebecca L. West, Lithonia; Douglas W. Kirby, Flowery Branch; Duel Seymore, Jonesboro, all of Ga.

[73] Assignee: The United States of America as represented by the Department of Health and Human Services, Washington, D.C.

[21] Appl. No.: 842,957

[22] Filed: Feb. 28, 1992

[51] Int. Cl.[5] .......... G01F 15/00

[52] U.S. Cl. .......... 116/276

[58] Field of Search .......... 73/323, 325; 4/615, 4/620; 116/276; 239/16, 25, 31, 71, 73, 74; 604/294, 296, 297, 298, 302, 303, 295

[56] References Cited

U.S. PATENT DOCUMENTS

| | | | |
|---|---|---|---|
| 2,458,876 | 1/1949 | Rehn | 604/302 |
| 3,599,251 | 8/1971 | Wright | 4/620 |
| 5,030,214 | 7/1991 | Spector | 604/301 |

*Primary Examiner*—Thomas B. Will
*Assistant Examiner*—W. Morris Worth
*Attorney, Agent, or Firm*—Lowe, Price, LeBlanc & Becker

[57] ABSTRACT

Apparatus and methods for periodically testing emergency wash units which involve the use of a transparent splash containment device which is positioned over an emergency wash unit and optionally attached thereto. The transparent splash containment device diverts and directs water flow to the drain of the emergency wash unit. An alignment indicator including sighting marks is provided to determine the alignment of the water flow. The sighting marks are provided with grid scales which can be used to estimate the velocity of the water flow.

20 Claims, 3 Drawing Sheets

SPLASH CONTAINMENT TESTING DEVICE FOR EMEGENCY EYE WASH UNITS

TECHNICAL FIELD

The present invention relates to methods and apparatus for testing emergency wash units. More particularly, the present invention relates to splash containment devices and methods of testing emergency wash units utilizing the splash containment devices.

BACKGROUND ART

The American National Standard Institute, ANSI Z358.1-1990, for Emergency Eyewash and Shower Equipment, Section 5.5.1 states that "Plumbed eyewash units shall be activated weekly to flush the line and to verify proper operation." Section 7.5.1 states that "Eye/face wash units shall be activated weekly to flush the line and to verify proper operation." Section 9.5.1 states that "Each combination unit shall be activated weekly to flush the line and to verify proper operation."

Emergency wash units, including eye wash units, eye/face wash units and combination units are provided in numerous facilities including hospital laboratories, clinical research laboratories, university laboratories, industrial laboratories, work shops, and industrial environments in which particles, projectiles and chemicals pose a hazard to eyes.

For proper operation, emergency eye wash units need to provide a sufficient flow of water which is aimed toward the eyes of a user. Accordingly, it is important that the units be periodically tested in order to ensure that the alignment of the water flow is correct. Moreover the units need to be tested to ensure that the rate of flow is at least 1.5 liters (0.4 gallons) per minute, that the flushing streams rise to approximately equal heights, and that the water will wash both eyes simultaneously at a velocity not injurious to the user. It is also important to periodically test the units in order to flush the water lines to which they are attached so as to ensure that the water lines are not plugged and that there are no particulates which have formed in the water lines which might be projected into a user's eyes.

Although the testing of emergency wash units is required and necessary in order to ensure proper operation, it is estimated that the majority of emergency wash units are not tested because of the ensuing splash and mess created during the testing.

There presently exists a need for a device and method which provides for a convenient way to periodically flush and test emergency wash units.

DISCLOSURE OF THE INVENTION

It is accordingly one object of the present invention to provide an apparatus for testing the operation of emergency wash units, including emergency eye wash units.

Another object of the present invention is to provide an apparatus for flushing emergency wash units, including emergency eye wash units.

A further object of the present invention is to provide an apparatus for testing the alignment and rate of flow of emergency eye wash units.

It is an even further object of the present invention to provide a method of flushing emergency wash units, including emergency eye wash units.

It is still a further object of the present invention to provide a method of testing emergency wash units, including emergency eye wash units.

According to these and other objects of the present invention which will become apparent as the description thereof proceeds below, the present invention provides an apparatus for testing emergency wash units which includes:

a transparent splash containment device for diverting water flow from an emergency wash unit; and means for removably attaching the splash containment device to the emergency eye wash unit.

The present invention further provides an apparatus for testing emergency eye wash units which includes:

a transparent splash containment device for diverting water flow from an emergency eye wash unit; and alignment indicator means for determining the alignment of water flow from the emergency eye wash unit.

In addition to the above, the present invention provides for a method of testing emergency wash units which involves:

positioning a transparent splash containment device over an emergency wash unit which diverts water flow from the emergency wash unit and directs the water flow to a drain of the emergency wash unit;

operating the emergency wash unit; and visually observing the water flow.

BRIEF DESCRIPTION OF DRAWINGS

The present invention will be described with reference to the attached drawings which are given by way of non-limiting examples only, in which.

BEST MODE FOR CARRYING OUT THE INVENTION

Figure 1:
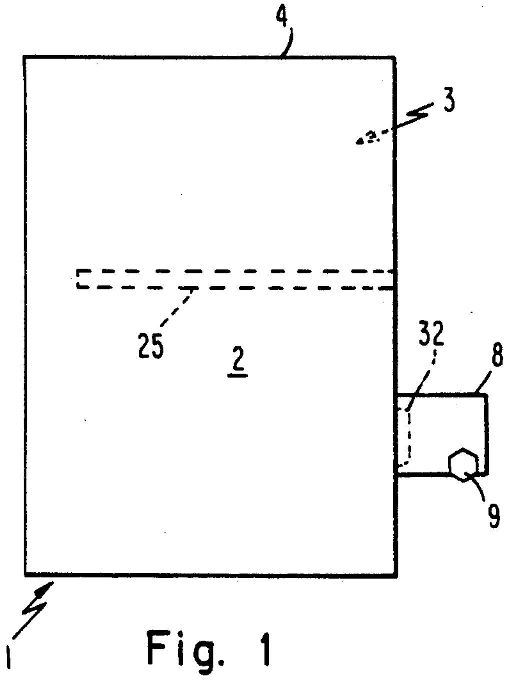
FIG. 1 is a front view of an apparatus for testing sink mounted emergency eye wash units according to one embodiment of the present invention.

The present invention provides splash containment devices for testing emergency wash units. In this regard, although the device will hereafter be described with reference to emergency eye wash units, it is to be understood that the devices and methods are applicable for use in conjunction with eye wash units, face/eye wash units and combination units, as described in ANSI Z-358.1-1990, incorporated herein by reference.

The splash containment device of the present invention can be utilized to test all types of emergency eye wash units, including emergency eye wash units that are sink mounted, wall mounted or deck mounted. The splash containment devices are unique in that they are designed so that during a testing operation of an eye wash unit, water flow is directed to the unit's drain system. This function of the invention enables testing of emergency eye wash units while diverting water flow which could otherwise splash and spill, resulting in a mess which would have to be subsequently cleaned up after each testing operation.

The splash containment devices of the present invention are designed so as to easily attached to existing sink mounted, wall mounted or deck mounted emergency eye wash units. In one embodiment of the invention described below, the splash containment device merely rests on the basin of the emergency eye wash unit. In another embodiment of the invention, the splash containment device is removably attached to a portion of the emergency eye wash unit.

The splash containment devices of the present invention are constructed from transparent materials, e.g., plastics. The use of transparent materials allows for visual observation to determine if the flushing streams rise to approximately equal heights, so that the water will wash both eyes simultaneously at a velocity not injurious to the user. The use of transparent materials also enables the tester to evaluate the sufficiency of water flow, the presence of any corrosion or particulates expelled from the water line, and the alignment of the water flow.

Although it is possible to roughly determine the alignment of the water flow by visually observing the water flow, according to one embodiment of the present invention, it has been found that alignment indicator means can be provided to accurately determine flow alignment. According to one embodiment, the alignment indicator means includes one or more sighting marks on one or opposite sides of the splash containment device. According to a further embodiment, the alignment indicator means includes a transparent gage member which is integral with the top of the splash containment device or is positioned within the splash containment device. In operation, the tester utilizes the sighting mark(s) or gage member to determine if the flushing streams rise to approximately equal heights, and are properly aimed so that the water will wash both eyes simultaneously at a velocity not injurious to the user.

As noted above, the alignment indicator may include one or more sighting marks on one side or the top of the splash containment device. Utilizing this embodiment, the tester observes if the water flow reaches a point which corresponds to the alignment of the sighting mark(s). In another embodiment, sighting marks are provided on opposite sides of the splash containment device. Utilizing this embodiment, the tester visually aligns the sighting marks and checks to see if the water flow reaches a point which is aligned with the sighting marks on each side of the splash containment device.

In a further embodiment, the splash containment device includes a transparent gage member fixed to an inside portion thereof, which transparent gage member includes alignment indicia. The transparent gage member is positioned horizontally inside the splash containment device or is otherwise incorporated into the top of the slash containment device so that the water flow impinges upon the gage member.

The water flow velocity can be estimated by observing how far the water flow projects. Otherwise, the sighting marks can include indicia, e.g., scales which correspond to the distance at which the water flow projects.

Figure 2:
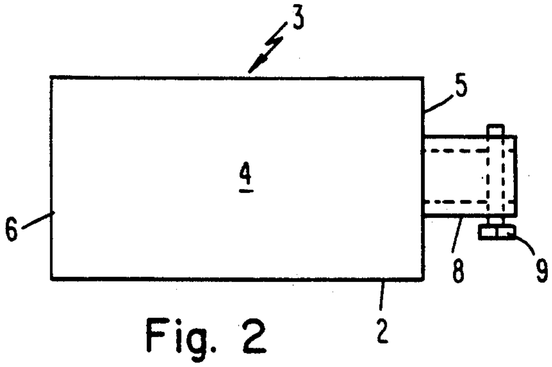
FIG. 2 is a plan view of the apparatus shown in FIG. 1.

FIG. 1 is a front view of an apparatus for testing sink mounted emergency eye wash units according to one embodiment of the present invention. As illustrated in FIG. 1 the apparatus or splash containment device 1 includes a rectangular front face 2 and a rectangular rear face 3. Likewise, as shown in FIG. 2, the apparatus or splash containment device 1 includes a rectangular top 4.

Figure 3:
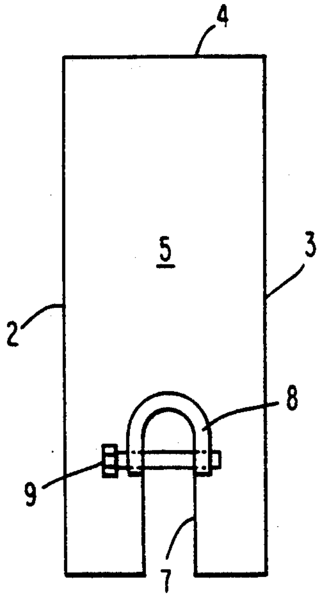
FIG. 3 is a side view of the apparatus shown in FIG. 1.

FIG. 3 is a side view of the apparatus shown in FIG. 1. As shown in FIG. 3, the apparatus or splash containment device 1 has rectangular sides 5 and 6. With one of the sides (5) includes a rounded-off slot 7, which extends from a lower edge of the side 5 as shown. A connector 8 is provided at the terminal or rounded-off portion of the slot 7. The connector 8 receives and can be fastened to the water line 10 of a sink mounted emergency eye wash unit 11 (see FIGS. 4 and 5).

The connector 8 should be made of a sufficiently sturdy material, e.g., plastic or metal, so that the device can be supported by securing the connector 8 to a water line 10 of an emergency eye wash unit 11. As shown, the connector is an inverted U-shaped structure which extends from the side 5 at the terminal or rounded-off portion of slot 7. According to one embodiment, the connector is sized so as to snugly fit over a water line 10 of an emergency eye wash unit 11. In this embodiment, the snug fitting connector 8 can be attached to the water line 10 by including a number of threaded throughbores through which one or more threaded connectors, e.g. bolts, may be tightened against the water line 10 to thus secure the connector 8 to the water line 10. In another embodiment shown in FIGS. 1-5, the connector 8 is tightened against a water line 10 by clamping the connector 8 to the water line 10. Such tightening may be effected by an external clamp or by a threaded member 9 which tightens one leg of the U-shaped connector 8 toward the other, around the water line 10.

Figure 4:
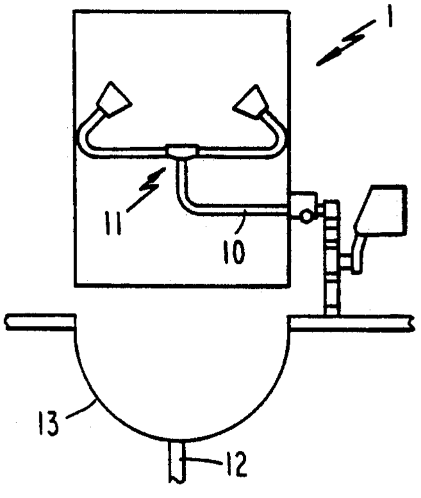
FIG. 4 is a view of the apparatus of FIG. 1 installed on a sink mounted emergency eye wash unit.

FIG. 4 is a view of the apparatus of FIG. 1 as installed on a sink mounted emergency eye wash unit 11. As illustrated, the splash containment device 1 is sized so as to receive therein a sink mounted emergency eye wash unit 11. FIG. 4 further shows how the splash containment device 1 is attached to and supported by the water line 10 and how the splash containment device 1 is positioned so as to direct water flow toward the drain 12 of the emergency eye wash 11, which in this case is the drain 12 of sink 13.

As can be seen from FIG. 4, the width of the splash containment device 1 is equal to or less than the width of sink 13.

Figure 5:
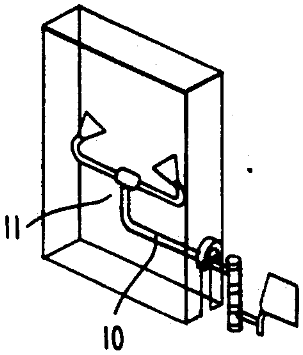
FIG. 5 is a prospective view of the installed apparatus of FIG. 4.

FIG. 5 is a prospective view of the installed apparatus of FIG. 4. FIG. 5 shows more clearly how slot 7 and connector 8 straddle water line 10 and how water line 10 is received by connector 8.

Figure 7:
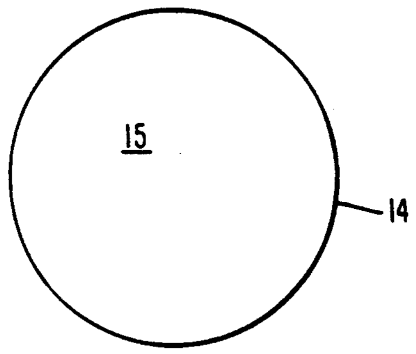
FIG. 7 is a plan view of the apparatus of FIG. 6.
Figure 6:
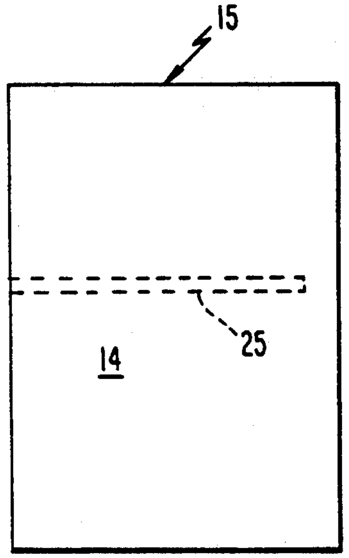
FIG. 6 is an elevational view of an apparatus for testing wall or deck mounted emergency eye wash units according to one embodiment of the present invention.

FIG. 6 is an elevational view of an apparatus for testing wall or deck mounted emergency eye wash units according to one embodiment of the present invention. FIG. 7 is a plan view of the apparatus of FIG. 6. As can be seen from FIGS. 6 and 7, this embodiment of the present invention involves a splash containment unit which has a cylindrical side wall 14 and a circular top 15 with an optional handle (not shown).

Figure 8:
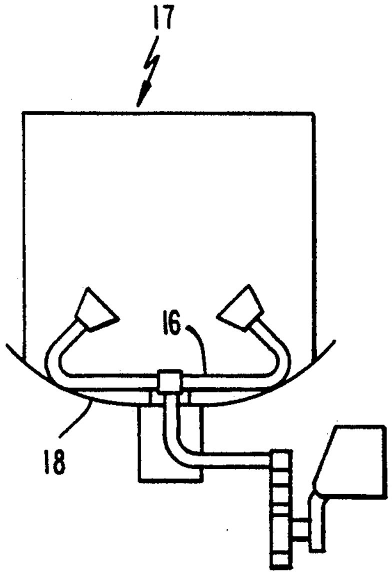
FIG. 8 is a view of the apparatus of FIG. 6 as installed on a wall or deck mounted emergency eye wash unit.
Figure 9:
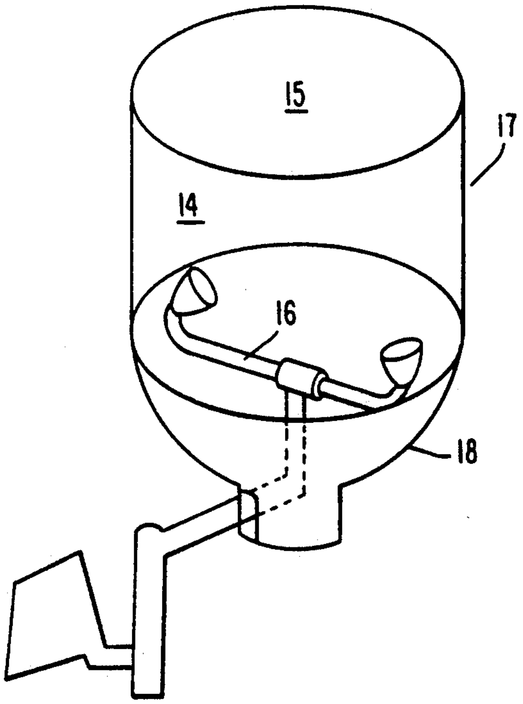
FIG. 9 is a perspective view of the installed device of FIG. 6.

FIG. 8 is a view of the apparatus of FIG. 6 as installed on a wall or deck mounted emergency eye wash unit 16. In this embodiment, the splash containment unit 17 basically rests on the basin 18 of the emergency eye wash 16 as shown. FIG. 9 is a perspective view of the installed device of FIG. 6.

Figure 10A:
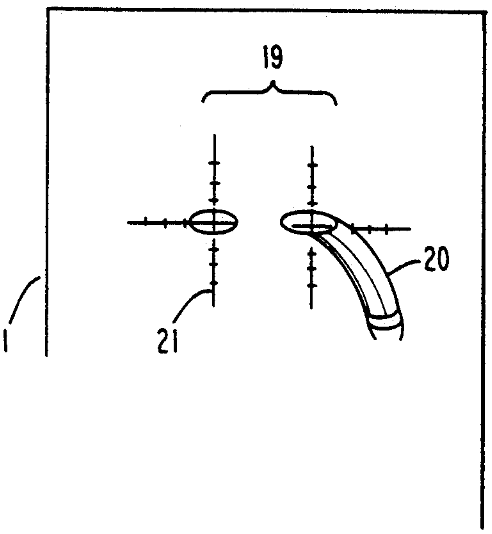
FIGS. 10*a*–10*d* depict several alignment indicator means according to different embodiments of the present invention.

As discussed above, the splash containment devices of the present invention are preferable made of a transparent material, e.g, transparent plastic. Moreover, in a preferred embodiment, the splash containment devices include alignment indicators having sighting marks which are illustrated in FIGS. 10*a*–10*d*. As depicted in FIG. 10*a* the alignment indicator includes a sighting mark 19 on one side of the splash containment device 1. Utilizing this embodiment, the tester looks straight onto the sighting mark 19 and looks to see if the water flow 20 reaches a point behind or in front of the sighting mark 19 (depending on which side of the transparent splash containment device the sighting mark is on). As shown in FIG. 10*a*, the sighting mark 19 can include a grid scale 21 which can be used to determine alignment of the water flow and an estimate of the velocity of the water flow. As would be expected, a high velocity of water flow would have a steeper profile, when viewed from the side, than a low velocity of water flow.

Figure 10B:
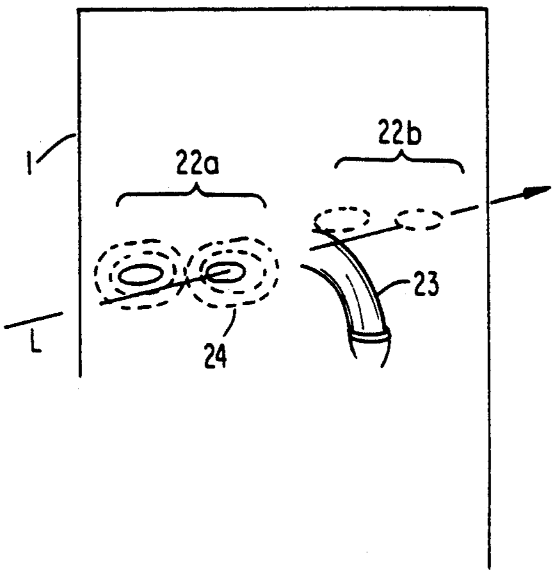

In the embodiment shown in FIG. 10*b*, the alignment indicator includes sighting marks 22*a* and 22*b* which are on opposite sides of the splash containment unit 1. Utilizing this embodiment, the tester positions him/herself so as to visually align sighting marks 22*a* and 22*b* on opposite sides of the splash containment device 1. Once the sighting marks are aligned (see line of sight "L"), the alignment of the water flow 23 is determined by observing the point at which the water flow 23 intersects the aligned sighting marks 22*a* and 22*b*. As shown in FIG. 10*b*, the sighting marks 22*a* and 22*b* can have circular or oval scales 24 that can be used to determine alignment of the water flow 23 and to estimate the velocity of the water flow.

Figure 10C:
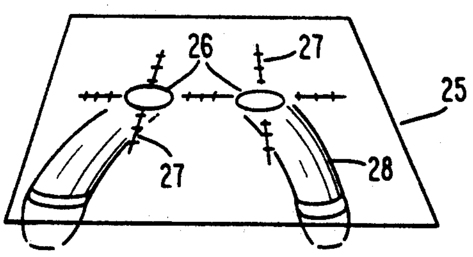

FIG. 10*c* illustrates one embodiment of a transparent gage member 25 which is designed to be horizontally positioned within a splash containment device of the present invention or incorporated into the top of the splash containment device. As depicted, the transparent gage member 25 includes alignment indicia in the form of centered ovals 26 (or circles) and a grid scale 27 which can be utilized to determine the alignment and velocity of the water flow 27.

Figure 10D:
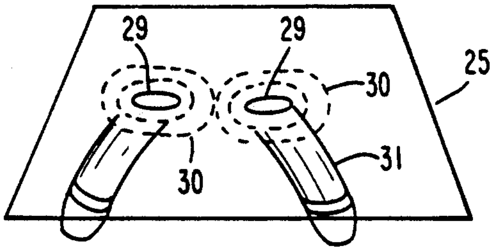

FIG. 10*d* illustrates an embodiment of the transparent gage member 25 which includes centered ovals 29 (or circles) and a corresponding oval-shaped grid scale 30 which can be utilized to determine the alignment and velocity of the water flow 31.

In use, the transparent gage member 25 is secured horizontally in a splash containment device (see phantom lines 25 in FIGS. 1 and 6), and the tester looks down onto the transparent gage member 25 to observe where the water flow impinges on the transparent gage member 25. In another embodiment, the gage member is an integral portion of the top of the splash containment device. That is, the alignment indicia can be included directly on or incorporated into the top.

It is to be understood that any one of the embodiments of the alignment indicators could be incorporated into either of the splash containment devices of FIGS. 1 through 9. Moreover, the sighting marks and particularly the grid scales discussed above are merely illustrative, and can be interchanged and/or combined. Moreover, other equivalent indicia can be easily utilized.

In a preferred operation procedure, the splash containment device is positioned over an emergency eye wash unit and secured thereto (sink mounted emergency eye wash unit). The emergency eye wash unit is then activated. Once activated, the tester first observes if the water line flushes out corrosion or other particulates. Next, the tester determines if the water flow rate appears to be adequate and if the water flow is aligned to reach a user's eyes during an emergency.

In one embodiment, it was found to be beneficial to include a resilient, e.g., rubber, sealing member in the connector 8 (see 32, FIG. 1) or slot 7 to prevent water from leaking during a testing procedure. Likewise, it has be found to be beneficial to include a resilient, e.g., rubber, sealing member in the bottom of the splash containment device illustrated in FIGS. 6–9, to prevent water from spilling.

Prototype devices were made from $\frac{1}{8}$" clear polycast acrylic. A splash containment device of the embodiment shown in FIGS. 1–5 was made and tested. This prototype was three inches deep, $10\frac{1}{4}$ inches wide and $14\frac{1}{4}$ inches high. Another prototype was made according to the embodiment shown in FIGS. 6–9. This prototype was $8\frac{3}{8}$ inches high and had an outside diameter of 10 inches. These dimensions of the prototype devices are given as non-limiting examples only. In general, the dimensions are determined from the size of the emergency eye wash and particularly the sink or basin into which water flow must be directed for proper drainage.

Although the present invention has been described with reference to particular means, materials and embodiments, from the foregoing description, one skilled in the art can easily ascertain the essential characteristics of the present invention and various changes and modifications may be made to adapt the various uses and characteristics thereof without departing from the spirit and scope of the present invention as described in the claims which follow.

What is claimed is:

1. An apparatus for testing emergency wash units which comprises:

a transparent splash containment device including an inverted container for containing water flow emerging from an emergency wash unit and for diverting the water flow to a drain of the emergency wash unit; and means for removably attaching said transparent splash containment device to the emergency wash unit.

2. An apparatus for testing emergency wash units according to claim 1, wherein said transparent splash containment device has a rectangular shape.

3. An apparatus for testing emergency wash units according to claim 1, wherein said transparent splash containment device includes a slot in one side wall thereof which extends from a lower edge of said one side wall and said means for removably attaching comprises a connector means fixed to an end portion of said slot for securing said transparent splash contaminant device to the emergency wash unit.

4. An apparatus for testing emergency wash units according to claim 3, wherein said connector means include a resilient seal member.

5. An apparatus for testing emergency wash units according to claim 3, wherein said connector means includes means for tightening said connector means to a portion of the emergency wash unit so as to support said transparent splash containment device.

6. An apparatus for testing emergency wash units according to claim 5, wherein said means for tightening comprises at least one threaded member which is received in a threaded bore of said connector means.

7. An apparatus for testing emergency wash units which comprises:

a transparent splash containment device including an inverted container for containing water flow emerging from an emergency wash unit and for diverting the water to a drain of the emergency wash unit; and alignment indicator means attached to a surface portion of said transparent splash containment device for determining alignment of water flow from the emergency wash unit.

8. An apparatus for testing emergency wash units according to claim 7, wherein said transparent splash containment device has a rectangular shape.

9. An apparatus for testing emergency wash units according to claim 7, wherein said transparent splash containment device has a cylindrical shape.

10. An apparatus for testing emergency wash units according to claim 7, wherein said alignment indicator means comprises one or more sighting marks on one side of said transparent splash containment device.

11. An apparatus for testing emergency wash units according to claim 10, wherein said alignment indicator means comprises one or more sighting marks on opposite sides of said transparent splash containment device.

12. An apparatus for testing emergency wash units according to claim 10, wherein said sighting marks include grid scales.

13. An apparatus for testing emergency wash units according to claim 11, wherein said sighting marks include grid scales.

14. An apparatus for testing emergency wash units according to claim 7, wherein said alignment indicator means comprises a transparent gage member positioned horizontally with respect to said transparent splash containment device.

15. An apparatus for testing emergency wash units according to claim 14, wherein said transparent gage member includes sighting marks.

16. An apparatus for testing emergency wash units according to claim 15, wherein said sighting marks include grid scales.

17. A method of testing emergency wash units which comprises:

positioning a transparent splash containment device which includes an inverted container over an emergency wash unit which transparent splash containment device diverts wash flow from the emergency wash unit and directs the water flow to a drain of the emergency wash unit;

operating said emergency wash unit; and testing said emergency wash unit by visually observing the water flow and quality of the water flow.

18. A method of testing emergency wash units according to claim 17, wherein said transparent splash containment device is provided with alignment indicator means for determining alignment of water flow from the emergency wash unit and said step of testing said emergency wash unit includes visually observing the water flow by means of said alignment indicator means.

19. A method of testing emergency wash units according to claim 17, wherein said emergency wash unit comprises a sink mounted emergency eye wash unit.

20. A method of testing emergency wash units according to claim 17 wherein said emergency wash unit is a wall mounted or deck mounted emergency eye wash unit.

* * * * *